Figure 1:
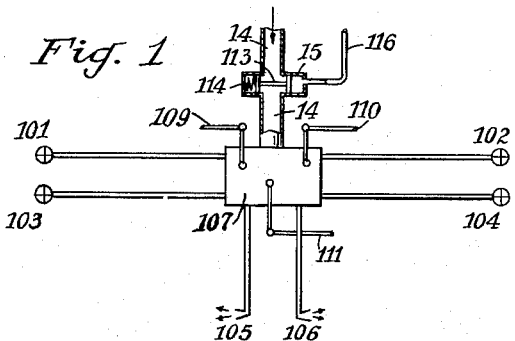

Nov. 27, 1962  R. LUCIEN  3,065,939
CONTROL SYSTEM FOR AIRCRAFT
Filed Dec. 23, 1957  3 Sheets-Sheet 1

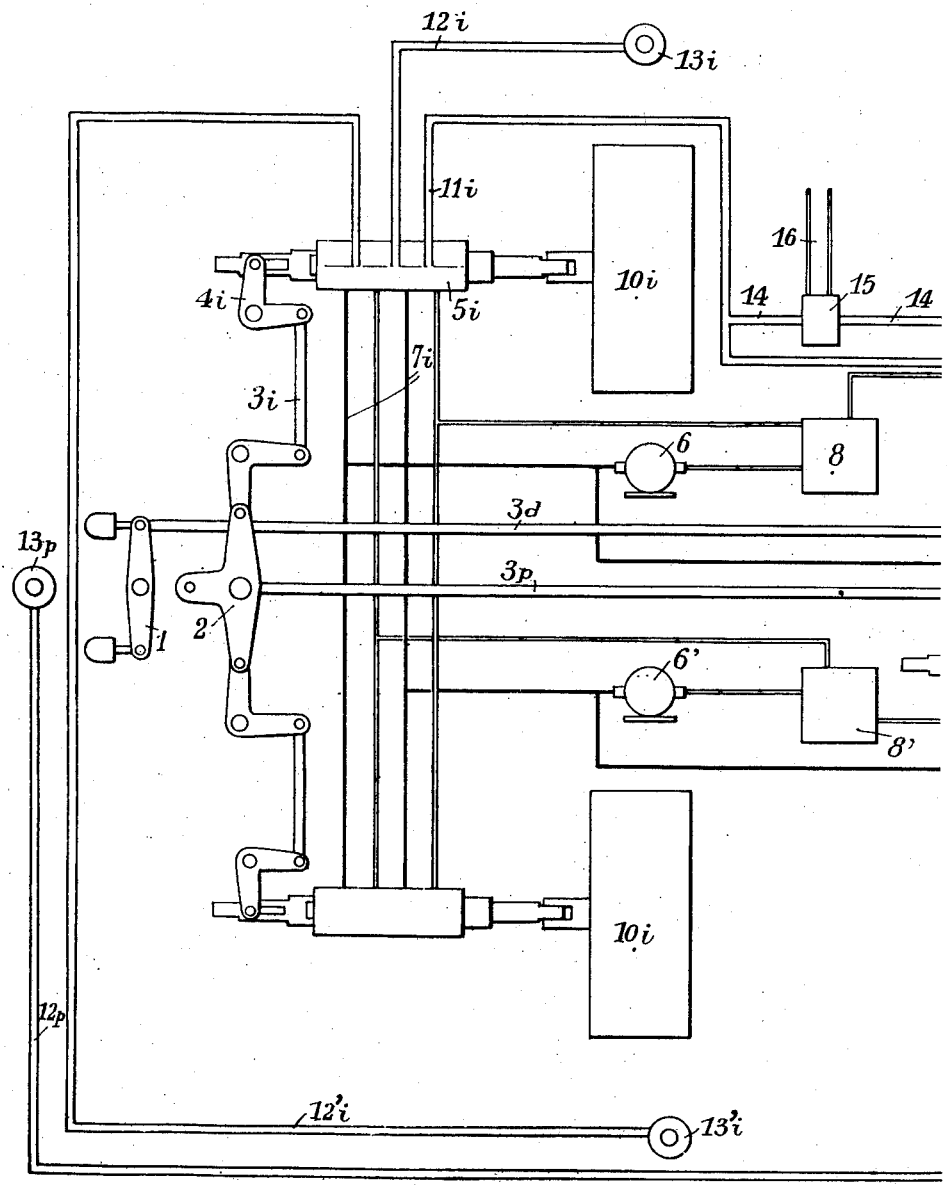

Nov. 27, 1962 R. LUCIEN 3,065,939
CONTROL SYSTEM FOR AIRCRAFT
Filed Dec. 23, 1957 3 Sheets-Sheet 3
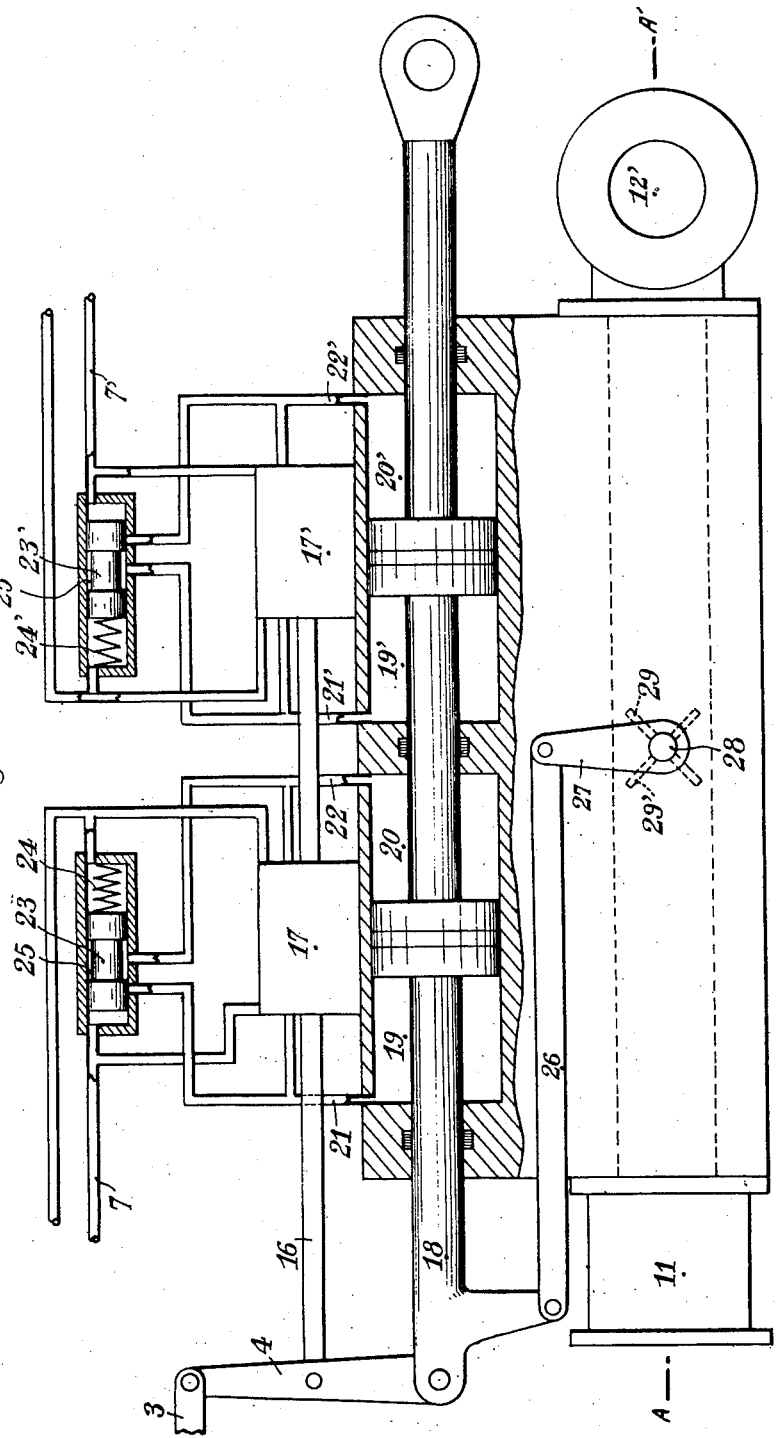

United States Patent Office 3,065,939
Patented Nov. 27, 1962

3,065,939
CONTROL SYSTEM FOR AIRCRAFT
Rene Lucien, Neuilly-sur-Seine, France, assignor to Recherches Etudes Production R.E.P., Paris, France
Filed Dec. 23, 1957, Ser. No. 704,756
Claims priority, application France July 12, 1957
4 Claims. (Cl. 244—76)

This invention comprises improvements in control systems for aircraft, particularly for aircraft having what is known as a vertical take-off.

There are in existence various types of aircraft capable of leaving the ground vertically or substantially vertically and then flying like normal aircraft, by means of aerofoils. During the vertical take-off phase, the machine is guided by means of a certain number of jets of gas under pressure which, while being able to participate in the vertical thrust, enable the machine to be controlled by a differential action. The desired turning moment for steering may be imparted to the aircraft either directly, that is to say by varying the reaction effect of the jets of gas, or, in machines where the upward thrust on leaving the ground is obtained by a flow of gas directed downwards (by means of a turbo-jet engine for example) by deflecting this flow of gas in a direction which will give the desired effect. It is thus to be understood that the invention described below may be applied to any control system for an aircraft in static flight by means of jets of compressed gas.

At the same time, during the normal-flight phase of the aircraft, that is to say when it is already travelling at a considerable speed, it is desirable to revert to the conventional system of aerodynamic flap and rudder control because the first system would then be very expensive and not very efficient.

The present invention relates to a device combining the two systems of control and rendering it possible to pass automatically and progressively from one to the other, the control members at the disposal of the pilot remaining the same during both phases of the flight and being similarly used. According to the invention progressive passage from one control system to the other is obtained automatically by a restrictor member interposed in a compressed-gas supply line, which restrictor member is controlled by the dynamic pressure of the atmospheric air due to the speed of flight of the aircraft.

In one embodiment of the invention each control-means (of pitch, of banking, or of yaw) comprises a servo-motor in the form of a hydraulic-jack actuating both the forms of aerodynamic control in question and a differential valve supplying a corresponding pair of jets of air. Each of the servo-motors has a mechanical input and consists of a double jack with two hydraulic circuits, with the object of safety in the event of failure of one of the circuits.

Figure 2:
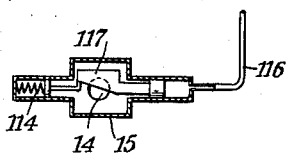
Figure 3A:
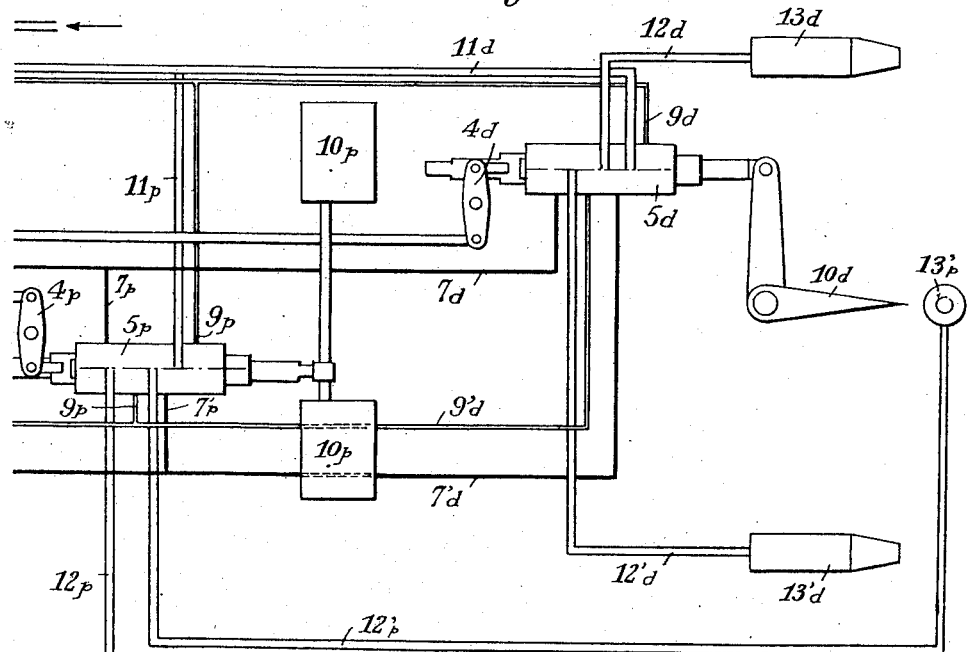
Figure 5:
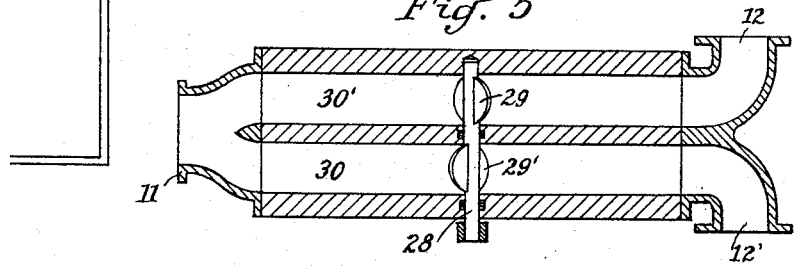

Certain embodiments of the invention will now be described by way of example, reference being made to the accompanying drawings, in which:

FIGURE 1 is a diagram illustrating a device according to the invention in principle;
FIGURE 2 shows a modification of a restrictor member shown in FIGURE 1;
FIGURES 3 and 3A comprise a general side-view of a hydraulically actuated control system, the front of the aircraft being assumed to be to the left in the figure;
FIGURE 4 shows in detail a double jack utilised in FIGURE 3 and a differential valve for air-jets which is mechanically coupled thereto;
FIGURE 5 is a section on the line A—A' of FIGURE. 4.

Referring to FIGURE 1, this shows diagrammatically in plan, a control system comprising six jets of gas, namely two jets 101 and 102 directed downwards and situated at the ends of the leading edge of the wing, two jets 103 and 104 directed downwards and situated at the ends of the trailing edge, and finally two opposed horizontal jets 105 and 106 directed outwardly and situated in the tail of the aircraft. The thrust supplied by these jets is controlled differentially by a distributor member or a group of distributor members shown diagrammatically at 107. It will be apparent that if the jets 101 and 102, while remaining equal, are stronger than the jets 103 and 104, the aircraft will effect a movement about its transverse axis in the sense which alters its elevation. If the combination of the jets 101 and 103 is stronger than the combination of the jets 102 and 104, it will effect a movement about its longitudinal axis and its bank will be modified. Finally, by differentiating the thrusts of the jets 105 and 106 it will be possible to cause the aircraft to turn.

The distributor member 107 may be of any type; it may comprise differential valves, which are known per se, for example from U.S. Patent 2,840,324. It is supplied with compressed gas through a conduit 14 and is controlled by a system having three input means shown diagrammatically at 109, 110 and 111 corresponding to the three degrees of freedom to be controlled, for example, 109 corresponds to the banking control 110 to the elevation control and 111 to the control of direction. These three input means may be of any type, mechanical, electrical or hydraulic. The control members for these three input means, at the disposal of the pilot, likewise and simultaneously control a conventional aerodynamic control system, which is not shown in FIGURE 1, for normal forward flight of the aircraft. This system may comprise, as will be explained for the embodiment illustrated in FIGURES 3, 4 and 5, hydraulic jacks with distributors subject to an input signal which may be mechanical, electrical, hydraulic or a combination of these various possibilities.

The aerodynamic control system continues to be actuated during the whole lift of the machine, but the gas-jet control system is progressively put out of action when the aircraft has gathered speed and the aerodynamic controls become sufficiently effective to guide the machine.

This device consists of an automatic restrictor unit 15 mounted in series in the compressed-gas supply to the distributor 107 (or equivalent members). This unit 15 comprises a slide valve 113 subject, on one side, to the action of a spring 114, which urges it in the direction which uncovers the compressed gas inlet 14, and on the other side to the dynamic pressure of the ambient air, which pressure is applied through an external air-inlet shown diagrammatically at 116.

The operation of the restrictor unit 15 is easily understood: As the dynamic pressure increases at 116 as a result of the speed, the slide 113 covers the compressed gas inlet 14, against the action of the spring 114, thus progressively putting the control system for the lift stage of flight out of action. The force of the spring 114 may be such that the gas-jet control system is put completely out of action when the aircraft reaches a speed corresponding, for example to Mach 0.3.

FIGURE 2 illustrates, in section perpendicular to the axis of the conduit 14, a specific form of the restrictor unit 15, wherein the slide comprises a blade 117 which progressively covers the opening of the conduit 14, and the outline of the blade may be designed to obtain any desired closing law as a function of the dynamic pressure, that is to say to obtain a predetermined progressive law for putting the static control system out of action as the aircraft gathers speed.

In the embodiment shown in FIGURES 3, 4 and 5, the device according to the invention no longer comprises a single distributor member such as that shown diagrammatically at 107, but hydraulic jacks, each of which jointly effects an aerodynamic control and the corresponding control for the vertical take-off stage.

On these figures, the members serving to control the machine are given reference numerals bearing the following suffixes: $d$ for the steering control (vertical axis), $p$ for the elevator control (transverse axis), $i$ for the banking control (longitudinal axis). This latter comprises two jacks to operate each of the wing ailerons, only one of the two being coupled to a differential valve for the banking control during lift. In the following description, only the construction and operation of the steering control will be described, the other controls being identical in operation.

A steering rod $3d$ actuates the input lever $4d$ of the steering jack $5d$. This jack is double and is supplied from two independent hydraulic pumps 6 and 6' (each of which is common to all three controls) through two independent pipelines $7d$ and $7'd$. The return is effected to the two common reservoirs 8 and 8' through two pipelines $9d$ and $9'd$.

The jack $5d$ actuates the rudder $10d$ in a conventional manner. At the same time, it comprises a system of differential valves which distribute the air originating from a pipeline $11d$ to the two pipelines $12d$ and $12'd$ which supply the ejection nozzles $13d$ and $13'd$. These two ejection nozzles are directed towards the rear of the aircraft and contribute towards its propulsion.

The other ejection nozzles: $13p$ and $13'p$ for the elevation, $13i$ and $13'i$ for the banking, are directed downwards and contribute towards the lift.

The compressed-air inlet 14 which supplies all these nozzles, is interrupted when the aircraft gathers speed (as in the case of FIGURE 1) by a spring-loaded slide-valve 15 subjected at 16 to the dynamic pressure of the external air.

FIGURE 4 illustrates any one of the double jacks such as $5d$ and the suffixes of the reference numerals have therefore been omitted.

The control of the jack is effected, as stated, from the steering gear 3 by means of the lever 4 which comprises three movable points of articulation, one to the end of the lever 3, one to a rod 16 controlling two distributor valves shown diagrammatically at 17, 17', and the last to the rod 18 of the double jack. Each of the distributor valves 17, 17' is of a type known per se from U.S. Patent 2,840,324. They are supplied through the pipelines 7 and 7' with fluid under pressure and supply fluid under pressure to one or the other of the chambers 19, 20 or 19', 20' respectively, through the pipelines 21, 22 or 21', 22'. In a manner known per se, they are such that, whatever the position given by the pilot to the steering gear 3, the point of articulation of the lever 4 and of the rod 16 returns to a fixed position as a result of the movement of the jacks which displace the point of articulation of the lever 4 and of the rod 18 through a corresponding distance. If the rod 16 did not return to its original position, the valves 17, 17' would feed the jacks at 19 or exhaust them at 20, causing movement of lever 4 and rod 16.

This double hydraluic system is completed by two slide valves 23 and 23', the purpose of each of which is to by-pass the two chambers of the jack cylinder corresponding thereto when, as a result of a breakdown, the hydraulic supply pressure of the circuit in question fails.

For example, if, as a result of an accidental stoppage of the pump 6, or as a result of a leakage, the supply pressure drops in the pipeline 7, the spring 24, which is initially stressed, will displace the slide valve 23 towards the left, bringing the pipelines 21 and 22 into communication through the annular space 25 provided in the central portion of the slide valve 23. Pipe lines 21, 22 communicate in this manner only in the event of such stoppage or leakage causing insufficient pressure and, in that event only, valve 17 is neutralized together with the left half 19—20 of the double jack, but the control is still exerted by the valve 17' and right half 19'—20' of the double jack..

The rod 18 of the double jack is coupled to the differential valve controlling the ejection of the jets of air for initial lift, through a system of rods 26, 27 actuating the shaft 28. The differential valve consists of two butterfly-valves 29, 29', arranged in planes at 90° to one another in two conduits 30 and 30' leading in parallel from the air-inlet pipe 11 and discharging respectively into the outlet pipes 12 and 12'. The rod system 26, 27 is keyed onto the shaft 28 in such a manner that when the rod 18 of the double jack is in the neutral position, the butterfly-valves 29 and 29' are each at 45° to the cross-sectional plane of the passages 30 and 30', and consequently allow equal flows of air to pass, but if the jack rod 18 is displaced the flow through one passage is diminished and through the other increased.

It is to be understood that the scope of the present invention includes any double control devices comprising conventional aerodynamic controls with controls by jets of air for non-propulsion flight, wherein the system of controls by means of jets of air is automatically put out of action when the aircraft gathers speed. In particular, for systems using hydraulic jacks, the distributor valves supplying the jack, which may be single or double-acting, may have an electrically controlled admission and not mechanical as in the embodiment illustrated in FIGURES 3, 4, and 5; they may likewise be mechanical but also comprise a second, e.g. electrical admission for flight stabilization signals.

I claim:

1. In a vertical take off aircraft: control means comprising two systems, one of said systems being adapted for controlling substantially vertical and static flight and including differential valves and sets of twin air-ejection nozzles coupled to and supplied by said differential valves, and the other of said systems being adapted for controlling horizontal, propulsive flight and including aerodynamic control elements and a servo-motor coupled to and controlling each of said elements; and a single control device comprising a restrictor member responsive to dynamic pressure of atmospheric air operatively associated with and adapted to deactivate one control system progressively, said control device comprising for each servo-motor a hydraulic jack having an output coupled to each of said valves.

2. A control means as claimed in claim 1, wherein the jacks are of the mechanical input-signal type.

3. A control means as claimed in claim 2, comprising duplicates of each of the jacks, said jacks each including a cylinder and means in the cylinder dividing the same into two chambers, two hydraulic supply and return circuits operatively coupled to the jacks, and a by-pass slide-valve coupled to and bringing the two chambers of the corresponding cylinder of the jack into communication when the hydraulic supply pressure fails.

4. A control means as claimed in claim 1 wherein each differential valve includes two parallel conduits supplying air to said air-ejection nozzles, a shaft, and two butterfly-valves keyed at 90° to one another on said shaft in said two parallel conduits.

References Cited in the file of this patent

UNITED STATES PATENTS

| | | |
|---|---|---|
| 1,398,976 | Ryder | Dec. 6, 1921 |
| 1,605,250 | Mac Kenzie | Nov. 2, 1926 |
| 2,179,179 | Fischel et al. | Nov. 7, 1939 |
| 2,188,834 | Fischel et al. | Jan. 30, 1940 |
| 2,616,264 | Grant et al. | Nov. 4, 1952 |
| 2,653,778 | Bennett et al. | Sept. 29, 1953 |
| 2,840,324 | Smith | June 24, 1958 |

FOREIGN PATENTS

| | | |
|---|---|---|
| 610,143 | Great Britain | Oct. 12, 1948 |